(12) United States Patent
Masalin et al.

(10) Patent No.: US 8,959,780 B2
(45) Date of Patent: Feb. 24, 2015

(54) CUTTING BLADE

(75) Inventors: Petteri Masalin, Helsinki (FI); Juha Huhtala, Karjaa (FI); Markus Paloheimo, Karjaa (FI); Fredrik Magnusson, Stockholm (SE)

(73) Assignee: Fiskars Brands Finland Oy AB, Billnas (FI)

( * ) Notice: Subject to any disclaimer, the term of this patent is extended or adjusted under 35 U.S.C. 154(b) by 274 days.

(21) Appl. No.: 13/312,705

(22) Filed: Dec. 6, 2011

(65) Prior Publication Data

US 2012/0174414 A1 Jul. 12, 2012

(30) Foreign Application Priority Data

Jan. 10, 2011 (FI) ................................. 20115024
Nov. 23, 2011 (EP) ................................. 11190210

(51) Int. Cl.
A01G 3/053 (2006.01)

(52) U.S. Cl.
CPC .................................. A01G 3/053 (2013.01)
USPC ............................................ 30/208; 30/223

(58) Field of Classification Search
CPC ........ A01G 3/053; A01G 3/0535; A01G 3/062
USPC ........... 30/208–210, 223, 230, 236, 225–226, 30/309, 244, 272.1, 369, 373–374; D8/8; 56/328.1, 333, 338
See application file for complete search history.

(56) References Cited

U.S. PATENT DOCUMENTS

| | | | | | |
|---|---|---|---|---|---|
| 2,252,601 | A | * | 8/1941 | Murphy | 30/211 |
| 2,964,845 | A | * | 12/1960 | Dooling | 30/216 |
| 3,293,746 | A | * | 12/1966 | Maxson | 30/223 |
| 3,798,768 | A | * | 3/1974 | Cowley et al. | 30/223 |
| 3,973,378 | A | * | 8/1976 | Bartasevich et al. | 56/11.9 |
| 4,216,582 | A | * | 8/1980 | Paule et al. | 30/216 |
| 5,153,996 | A | * | 10/1992 | Kuzarov et al. | 30/223 |
| 5,771,583 | A | * | 6/1998 | Kremsler et al. | 30/216 |

(Continued)

FOREIGN PATENT DOCUMENTS

| | | |
|---|---|---|
| DE | 37 29 487 | 3/1989 |
| DE | 19539603 A1 | 4/1997 |
| DE | 195 39 603 C2 | 2/2000 |

(Continued)

OTHER PUBLICATIONS

Finnish search report dated Sep. 29, 2011, 1 page.

(Continued)

*Primary Examiner* — Boyer D Ashley
*Assistant Examiner* — Fernando Ayala
(74) *Attorney, Agent, or Firm* — Foley & Lardner LLP

(57) ABSTRACT

A cutting blade includes a first and a second elongated frame part, and projections protruding from the first and the second elongated frame part in the cross direction. The first and the second frame part are attached to each other by blades, the blades being individually attached to the first frame part at first pivot points and to the second frame part at second pivot points so that the opposite ends of the blades protrude from the first and second pivot points, respectively, in the cross direction of the frame parts. The first and the second elongated frame part are movable relative to each other to rotate the blades around the first and second pivot points and to generate a cutting movement between each end of the blade and projection approaching each other.

14 Claims, 3 Drawing Sheets

(56) References Cited

U.S. PATENT DOCUMENTS 7,406,770 B2 * 8/2008 Mace et al. .................. 30/216
2002/0095794 A1 * 7/2002 Liu .............................. 30/219

FOREIGN PATENT DOCUMENTS

| | | |
|---|---|---|
| EP | 0635200 A1 | 1/1995 |
| EP | 0820692 A1 | 1/1998 |
| GB | 0 237 195 A | 7/1925 |
| GB | 2209453 A | 5/1989 |
| SE | 99728 C | 8/1940 |
| WO | WO-95/21521 | 8/1995 |

OTHER PUBLICATIONS

European Search Report for EP Application No. 11190210, dated Mar. 27, 2014, 2 pages.

* cited by examiner

CUTTING BLADE

FIELD OF THE INVENTION

The present invention relates to a cutting blade which is, in the following, primarily described with reference to the cutting blade of a hedge trimmer. It is to be noted, however, that the cutting blade according to the invention is applicable in other contexts as well.

DESCRIPTION OF PRIOR ART

A cutting blade for hedge trimmers, for example, that comprises a first and a second elongated frame part is known from the prior art. There are projections protruding in the cross direction from the first and the second frame part. When, during the use, the frame parts of the cutting blade are moved back and forth relative to each other in their longitudinal direction, the branches having ended up between the projections are cut due to the effect of the pressing forces between the projections.

One of the problems relating to the above known cutting blade is its inefficiency. The force required for generating the reciprocal movement of the first and the second frame part must be made relatively great in order for the cutting blade to work in practice.

SUMMARY OF THE INVENTION

An object of the present invention is to solve the above problem and to provide a cutting blade that is more efficient than the previous ones. This object is achieved with a cutting blade in accordance with independent claim 1.

The invention utilizes blades pivoted to the first and the second frame part at pivot points. The first and second elongated frame parts are movable relative to each other, whereby the blades rotate around the pivot points, and a cutting movement is generated between the projections and the blade ends approaching each other. Thus, a considerably more efficient cutting blade is provided, compared with known solutions. In this application, the concept "the first and second elongated frame parts are movable relative to each other" means that either both the first and the second blade are movable or, alternatively, that only one is movable while the other is arranged fixedly, in which case movement of the blades relative to each other is realized as well.

Preferred embodiments of the cutting blade in accordance with the invention are disclosed in the attached dependent claims.

BRIEF DESCRIPTION OF THE FIGURES

The invention will be described in the following in greater detail by way of example and with reference to the accompanying figures, of which.

DESCRIPTION OF AT LEAST ONE EMBODIMENT

Figure 1:
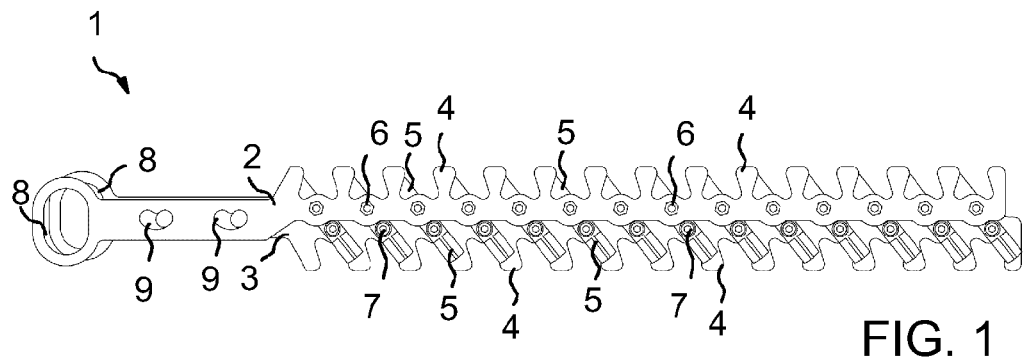
FIG. 1 shows a top view of a cutting blade.
Figure 2:
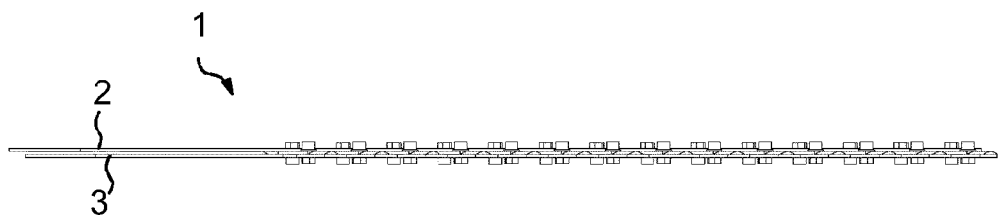
FIG. 2 shows a side view of the cutting blade of FIG. 1.
Figure 3:
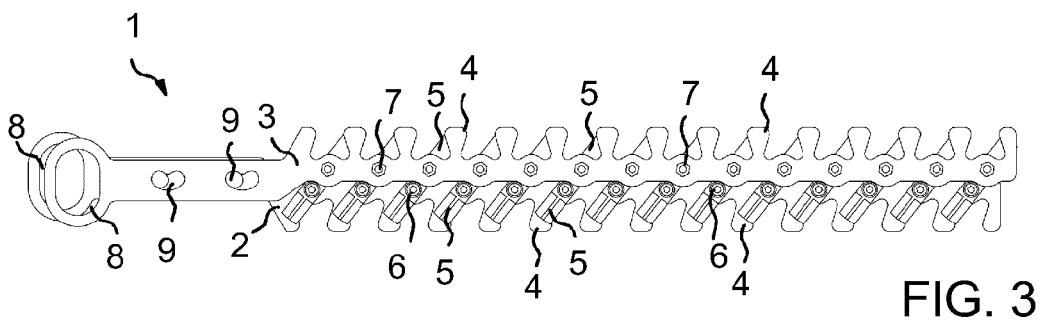
FIG. 3 shows the cutting blade of FIG. 1 from below.
Figure 4:
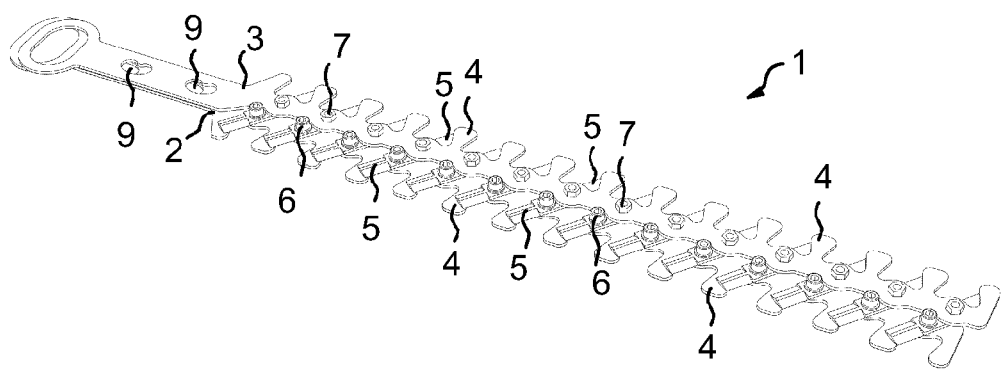
FIG. 4 shows a perspective view of the cutting blade of FIG. 1.
Figure 5:
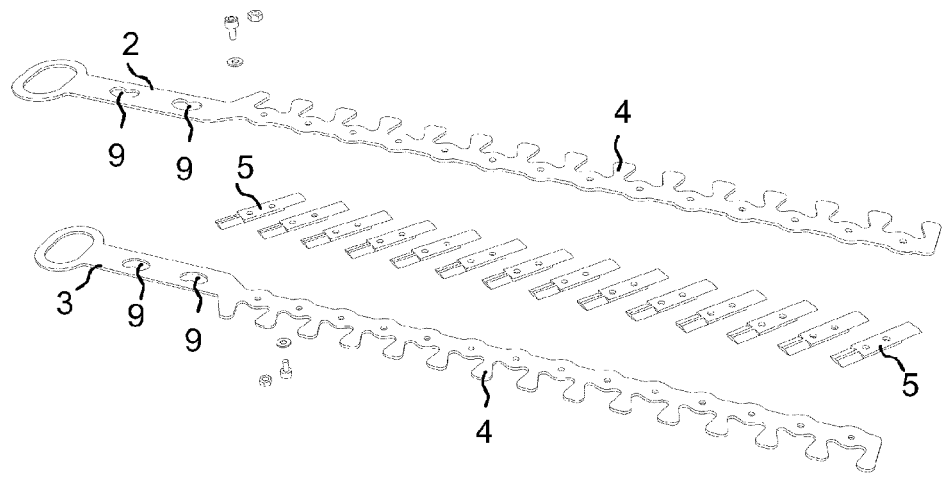
FIG. 5 shows the cutting blade of FIG. 1 disassembled.

FIGS. 1 to 5 illustrate a first embodiment of a cutting blade 1. The cutting blade 1 comprises a first 2 and a second 3 elongated frame part. The frame parts may be manufactured of an appropriate durable material, such as steel. As becomes apparent from the figures, the first and second frame parts 2 and 3 are arranged substantially in parallel with one another.

There are projections 4 protruding from the first 2 and the second 3 frame part in the cross direction. These projections 4 cooperate with blades 5 attached to the frame parts 2 and 3 when the cutting blade 1 is in use, for instance when a bush is being cut.

The cutting blade 1 comprises a plurality of blades 5 which are, in the embodiment of the figures, formed of mainly rectangular pieces which may be manufactured of a suitable material, such as steel. Each blade 5 may be formed of an individual piece, whereby its upper end (which is possibly sharpened) cooperates with the projections 4 of the first frame part 2 to provide cutting, and its lower end (which is possibly sharpened) cooperates with the projections 4 of the second frame part 3 to provide cutting. Alternatively, an individual blade 5 may be formed of two pieces attached to each other by screws or the like at pivot points 6 and 7, in which case the upper piece of the two cooperates with the projections 4 of the frame part 2 to provide cutting, and the lower piece cooperates with the projections 4 of the second frame part 3 to provide cutting.

In the illustrated embodiment each frame part 2 and 3 comprises projections 4 projecting in only one direction, in other words away from the other frame part. Consequently, the projections 4 of the first frame 2 part project in the cross direction away from the second frame part 3, and the projections of the second frame part 3 project in the cross direction away from the first frame part 2.

The blades need not, however, be shaped as shown in the figures but other shapes are feasible as well. One alternative is to use blades which are mainly formed of triangular pieces.

In the embodiment of the figures, the blades 5 are attached to the first frame part 2 individually side by side by means of the first pivot points 6. Correspondingly, the blades 5 are attached to the second frame part 3 individually by means of the pivot points 7. The blades 5 that attach the first 2 and the second 3 frame part to each other extend from the pivot points 6 and 7 in such a way that the ends of the blades 5 protrude from the pivot points in the cross direction of the frame parts 2 and 3.

In the example shown in the figures, the first and second pivot points 6 and 7 are implemented with screws penetrating the frame parts 2, 3 and the blades 5 that are locked in place with nuts. The blades may thus rotate around the pivot points relative to the frame parts 2 and 3. The use of screws and nuts is, however, only one example of how the pivot points can be implemented in practice. Other alternatives may also be utilized, such as using rivets, in which case there is no need for screws or nuts.

At a first end of the first and the second frame part 2 and 3, an operation opening 8 is formed to receive the transmission member of the actuator of the cutting blade 1. The actuator may be formed of a device provided with, for example, an electric motor or a combustion engine, whereby a pin serving as the transmission member for this device and eccentrically attached to a rotating plate, for example, penetrates into the operation opening 8 of the first frame part 2, for example. A corresponding pin eccentrically attached to a rotating plate may penetrate into the operation opening of the second frame part 3. Alternatively, the pin penetrating into the operation opening of the second frame part 3 may be a pin arranged fixedly on the frame of the actuator. In any case, the actuator generates, irrespective of the manner of attachment, a reciprocal movement of the frame parts 2 and 3 during the use of the cutting blade 1. The first end of the frame parts 2 and 3 is provided with curved openings 9 through which the pins arranged fixedly on the frame of the actuator penetrate when the cutting blade is mounted on the actuator. Owing to these openings 9 and pins, the cutting blade is firmly attached to the actuator.

Figure 6:
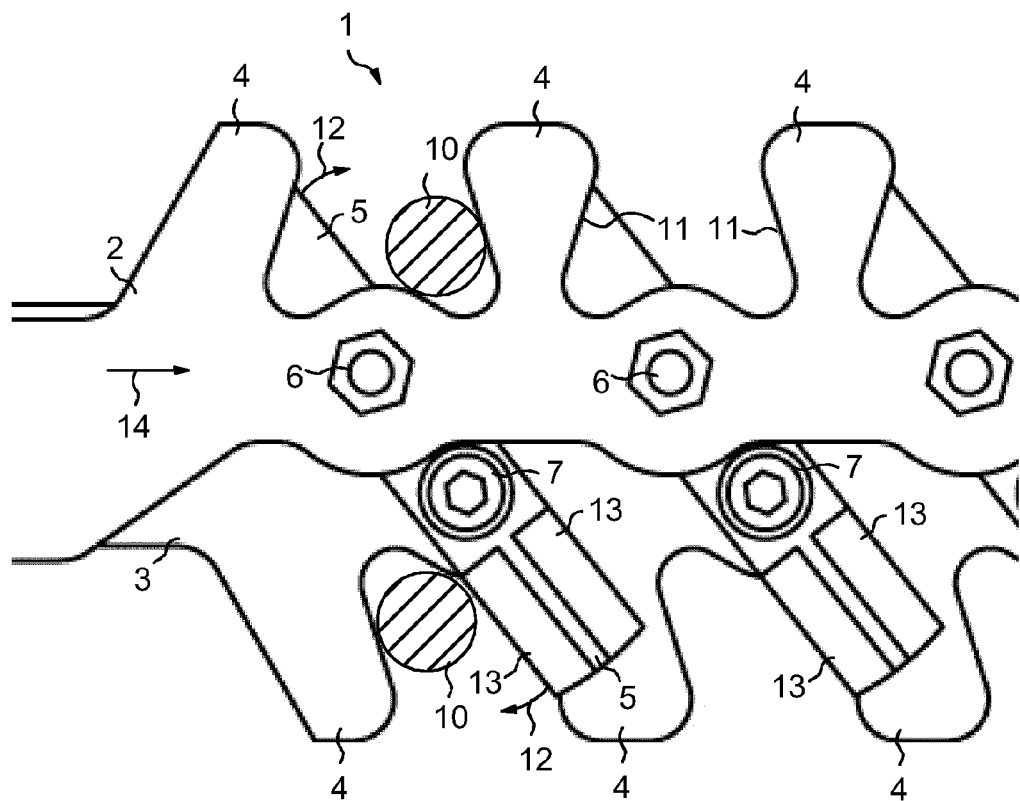
FIG. 6 illustrates a part of the cutting blade of FIG. 1 during the cutting process.
Figure 7:
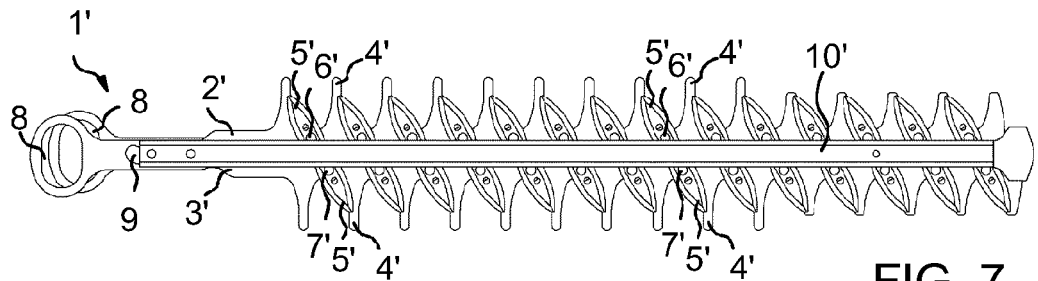
FIG. 7 shows a top view of second embodiment of a cutting blade.
Figure 8:
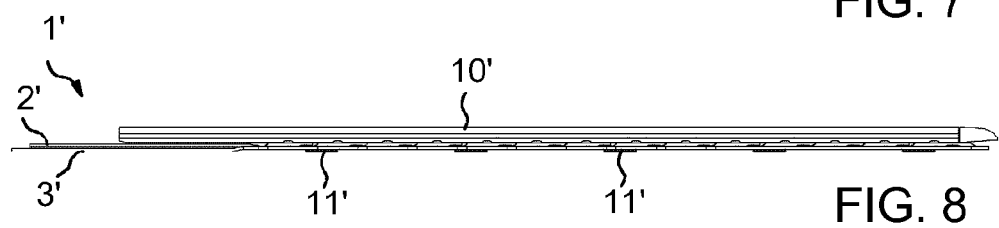
FIG. 8 shows a side view of the cutting blade of FIG. 7.
Figure 9:
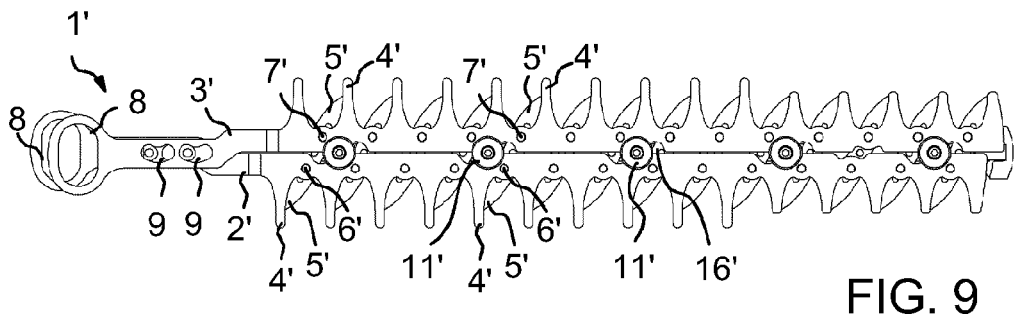
FIG. 9 shows the cutting blade of FIG. 7 from below.

FIG. 6 illustrates a part of the cutting blade 1 of FIG. 1 during the cutting process. FIG. 6 shows two objects to be cut, for instance branches 10. During the use of the cutting blade 1, the object to be cut is taken to the space between the projections 4 in the manner shown by the figure. Subsequently, the frame parts 2 and 3 are moved relative to each other primarily in their longitudinal direction. At the moment of FIG. 6, the first frame part 2 is assumed to be moved to the right in the direction of arrow 14, whereas the second frame part 3 is held in place or alternatively moved in the opposite direction.

Due to the longitudinal movement 14 of the first frame part 2, the blades 5 rotate around the first pivot points 6 and the second pivot points 7. Thus, the blades 5 rotate in the direction shown by arrows 12. Between the ends of the blades 5 and the projections 4 approaching each other, a cutting movement is then generated which results in the branches 10 being pressed between the ends of the blade 5 and the projections 4. The figures show, by way of example, that the ends of the blades 5 are sharpened 13 in order for the cutting to succeed with as little force as possible. It is also feasible to arrange a corresponding sharpened portion in the projections 4.

It is seen in FIG. 6 that edges 11 of the adjacent projections 4, positioned opposite to one another, are at least partly directed in such a way that the distance between the edges decreases as the distance from the joining points of the projections 4 and the frame parts 2 and 3 increases. Owing to such shaping of the projections, the end of the blade 5 and the projection overlap at first at the outer end of the projection 4. At this stage, the blade 5, the projection 4 and the frame part form a closed loop, through which the branch 10 to be cut is projecting. After this, the branch 10 cannot slide away from the closed loop any longer when the cutting movement continues. At this point, when the loop is already closed, the actual cutting process begins and can then be followed through in a manner that prevents the branch from sliding away before it has been cut.

In the embodiments shown in the figures, the projections 4 and the pivot points 6 and 7 are positioned in such a way relative to each other that when observed in the longitudinal direction of the frame parts 2 and 3, the pivot points 6 and 7 are positioned between the projections 4. In this way, a symmetrical cutting blade is provided where the blades 5 do the cutting in both directions of rotation, i.e. both when the first frame part 2 moves to the right in FIG. 6 and the blades 5 rotate clockwise around the pivot points 6 and 7 and when the first frame part 2 moves to the left and the blades 5 rotate anticlockwise around the pivot points 6 and 7.

FIGS. 7 to 10 illustrate a second embodiment of a cutting blade 1'. The embodiment of FIGS. 7 to 10 is very similar to the one explained in connection with FIGS. 1 to 6, and therefore the embodiment of FIGS. 7 to 10 will mainly be explained by referring to the differences between these embodiments.

Figure 10:
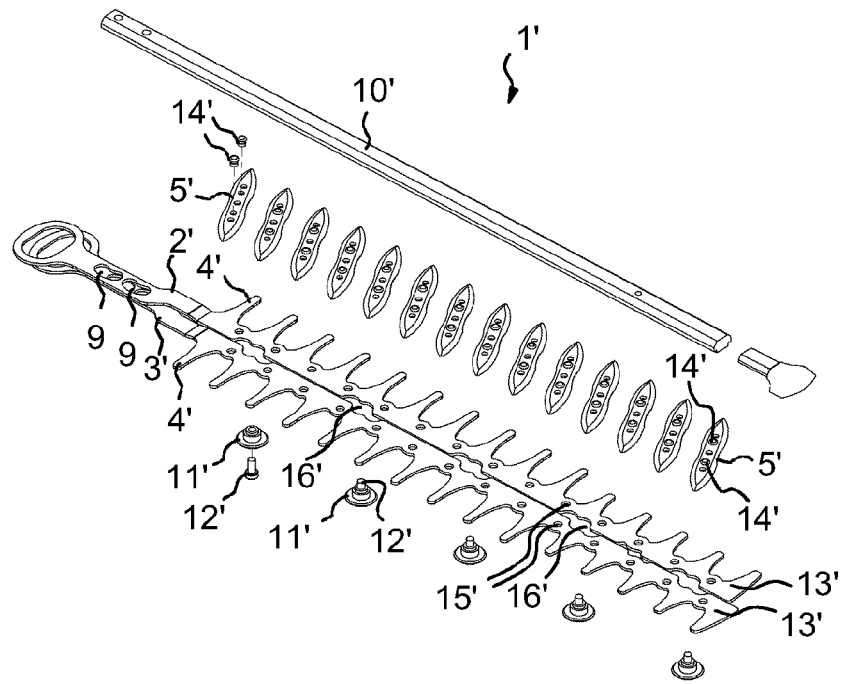
FIG. 10 shows the cutting blade of FIG. 7 disassembled.

In FIGS. 7 to 10 the first 2' and second 3' elongated frame parts are shaped to have a respective blade surface 13' in a common plane, as most clearly shown in FIG. 10. Still in the area of the curved openings 9 the first 2' and second 3' elongated frame part overlap each other. However, slightly to the right of the openings where the first projection 4' is located, the blade surfaces 13' of the first 2' and second 3' elongated frame part are located in the same plane. Therefore the blades 5' can be arranged on the same side of the first 2' and second 3' elongated frame part against the blade surfaces 13'. Such a solution is advantageous at it becomes easier to assemble the cutting blade. Additionally it is possible to make the blades 5' sharp in both ends by removing material from only one side of the blades 5'.

It is possible to attach the blades 5' to the first 2' and second 3' elongated frame part at the pivot points 6 and 7 with screws (possibly in combination with nuts) or rivets similarly as has been illustrated in the embodiment of FIGS. 1 to 6. If so, then no additional parts are necessary to attach the frame parts 2', 3' and the blades 5' to each other. However, in FIGS. 7 to 10 an alternative attachment solution is illustrated.

In the illustrated example the blades 5' are provided with protrusions 14' which are fixedly attached to the blades 5' at the locations of the first 6 and second 7 pivot points. The first 2' and second 3' frame parts are provided with holes 15' at the locations of the first 6 and second 7 pivot points for receiving the protrusions 14'. Once the blades 5' have been arranged on top of the blade surfaces 13' of the frame parts 2' and 3' such that the protrusions 14' protrude into the holes, an elongated attachment element 10' is arranged on top of the blades 5'. Screws 12' with sleeves 11' are arranged to protrude through gaps 16' between the frame parts 2' and 3' and into holes in the elongated attachment element 10'. These screes press the frame parts 2', 3' and the elongated attachment element 10' towards each other, such that the blades 5' remain in their illustrated locations with the protrusions 14' in the holes 15'.

In the illustrated embodiment it has been shown that the blades 5' include protrusions 14' and that the frame parts 2' and 3' include holes. However, the opposite solution is naturally also possible, in other words that the protrusions are arranged in the frame parts and the holes in the blades.

In FIGS. 7 to 10 the shape of the projections 4' is different than in the embodiment of FIGS. 1 to 6. However, this is only by way of example. In practice projections 4 with the shape shown in FIGS. 1 to 6 may be implemented in the embodiment of FIGS. 7 to 10, and similarly, projections 4' with the shape shown in FIGS. 7 to 10 may be implemented in the embodiment of FIGS. 1 to 6.

It is to be understood that the above description and the related figures are only intended to illustrate the present invention. It will be obvious to a person skilled in the art that the invention may also be varied and modified in other ways without departing from the scope of the invention.

The invention claimed is:

1. A cutting blade assembly, comprising:
a first and a second elongated frame part; and
projections protruding from the first and the second elongated frame part in the cross direction, wherein
the first and the second frame part are attached to each other by blades having a first end and a second end, the first end and the second end of the blades are sharpened, the blades being individually attached to the first frame part at first pivot points and to the second frame part at second pivot points in such a way that opposite first and second sharpened ends of a single blade protrude from the first and second pivot points, respectively, in the cross direction of the frame parts; and the first and the second elongated frame parts are movable relative to each other to rotate the blades around the first and second pivot points and to provide cutting between the first sharpened ends of the blades and projections of the first elongated frame part approaching each other and to provide cutting between the second sharpened ends of the blades and projections of the second elongated frame part approaching each other.

2. A cutting blade assembly according to claim 1, wherein the first and second elongated frame parts of the cutting blade assembly each comprises projections projecting away from the other elongated frame part, the edges of adjacent projections in the same elongated frame part which are positioned opposite to each other are at least partly directed in such a way that the distance between the edges decreases as the distance to the respective elongated frame part increases.

3. A cutting blade assembly according to claim 1, wherein in the first frame part, the first pivot points are positioned between the projections, seen in the longitudinal direction, and in the second frame part, the second pivot points are positioned between the projections, seen in the longitudinal direction.

4. A cutting blade assembly according to claim 1, wherein a first end of the first and the second frame part, respectively, is provided with an operation opening to receive the transmission member of the actuator of the cutting blade assembly.

5. A cutting blade assembly according to claim 1, wherein the first and the second frame part, respectively, are provided with one or more curved grooves between an operation opening and the pivot point in the respective elongated frame part which is located closest to it to receive support pins in an actuator of the cutting blade assembly.

6. A cutting blade assembly according to claim 1, wherein the cutting blade assembly is the cutting blade assembly of a hedge trimmer.

7. A cutting blade assembly according to claim 1, wherein
the first and second elongated frame parts are shaped to have a respective blade surface in a common plane, and
the blades are arranged on a same side of the first and second elongated frame part against the respective blade surfaces which are located in the common plane.

8. A cutting blade assembly according to claim 1, wherein the blades are individually attached to the first frame part at first pivot points and to the second frame part at second pivot points by screws or rivets.

9. A cutting blade assembly according to claim 8, wherein
the blades comprise protrusions protruding into holes in the frame parts at the locations of the first and second pivot points or the frame parts comprise protrusions protruding into holes in the blades at the locations of the first and second pivot points,
the cutting blade assembly comprises en elongated attachment element arranged against a surface of one or more blades such that the blades are located between the elongated attachment element and the frame parts, and
the elongated attachment element is fixed to the cutting blade assembly by screws or rivets attaching the frame parts and the elongated attachment element to each other such that the attachment element presses the blades against the frame parts and the keeps the protrusions in the holes.

10. A cutting blade assembly according to claim 1, wherein the opposite ends of the blades have been sharpened by removing material from only one side of the blades.

11. A cutting blade assembly, comprising:
a first and a second elongated frame part movable relative to each other in a reciprocating manner;
a plurality of projections protruding from the first and the second elongated frame part in the cross direction and defining spaces therebetween;
a plurality of blades having a first end and a second end, the first end and the second end of the blades are sharpened and individually coupled to the first elongated frame part at first pivot points disposed along a length of the first elongated frame part and to the second elongated frame part at second pivot points disposed along a length of the second elongated frame part, so that the opposite first end and the second ends of a single blade protrude from the first and second pivot points, respectively, and rotate about the first and second pivot points and move across spaces between the projections as the first and second elongated frame parts move relative to each other in a reciprocating manner and provide cutting between the first sharpened ends of the blades and projections of the first elongated frame part approaching each other and provide cutting between the second sharpened ends of the blades and projections of the second elongated frame part approaching each other.

12. The cutting blade assembly according to claim 11, wherein the spaces between the projections define a shape that forms a closed loop with the blades as the blades move across the spaces.

13. A cutting blade assembly, comprising:
a first and a second elongated frame part each having a plurality of laterally extending projections, at least some of the projections having an increasing width proximate their free ends;
a plurality of blades having a first end and a second end, the first and the second end of the blades are sharpened and coupled to the first elongated frame part at first pivot points disposed along a length of the first elongated frame part and to the second elongated frame part at second pivot points disposed along a length of the second elongated frame part, so that the blades rotate about the first and second pivot points and move across spaces between the projections as the first and a second elongated frame parts move relative to each other in a reciprocating manner and provide cutting between the first sharpened ends of the blades and projections of the first elongated frame part approaching each other and to provide cutting between the second sharpened ends of the blades and projections of the second elongated frame part approaching each other.

14. The cutting blade assembly according to claim 11, wherein the increasing width of the projections define a shape between adjacent projections that forms a closed loop with the blades as the blades move across the spaces.

* * * * *